Nov. 10, 1925.
R. H. KLAFFKI
1,560,584
APPARATUS FOR SPLICING MOTION PICTURE FILMS
Filed Oct. 17, 1921
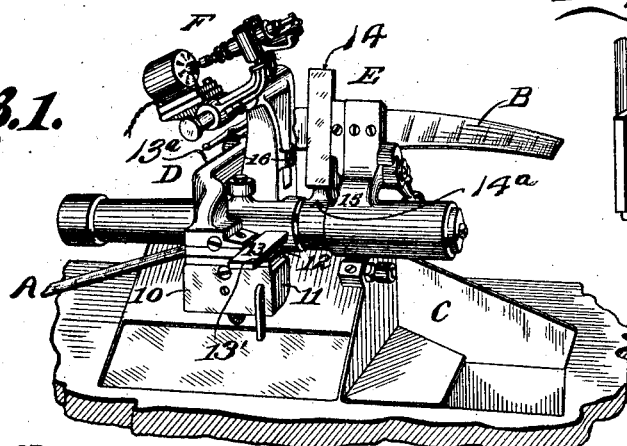
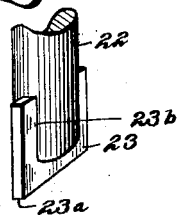
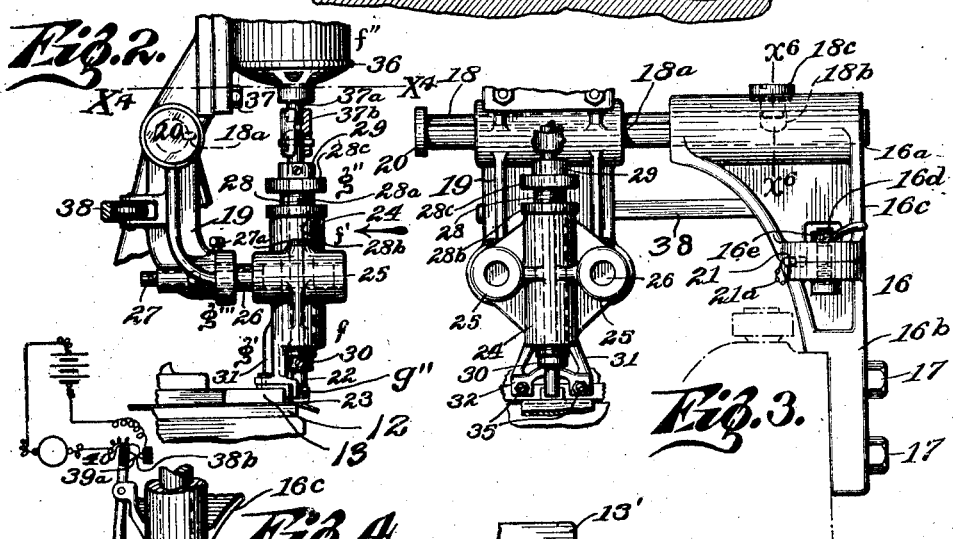
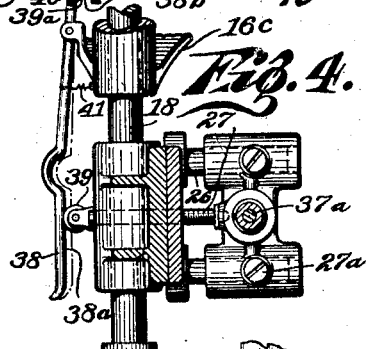
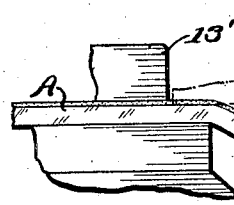
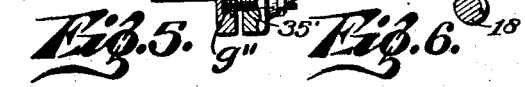
INVENTOR.
Roy H. Klaffki
BY Alfred H. Daehler,
ATTORNEY.

Patented Nov. 10, 1925.

1,560,584

UNITED STATES PATENT OFFICE.

ROY HENRY KLAFFKI, OF LOS ANGELES, CALIFORNIA.

APPARATUS FOR SPLICING MOTION-PICTURE FILMS.

Application filed October 17, 1921. Serial No. 508,397.

*To all whom it may concern:*

Be it known that I, ROY HENRY KLAFFKI, a citizen of the United States, residing at Los Angeles, in the county of Los Angeles and State of California, have invented new and useful Improvements in Apparatus for Splicing Motion-Picture Films, of which the following is a specification.

This invention relates to apparatus for splicing or joining film such as the photographic film ordinarily employed in photography and more particularly in motion picture photography.

The splicing of motion picture films by the methods ordinarily employed is coupled with the absorption of an extraordinary amount of time the greater portion of which is consumed in the scraping of emulsion-removing process preceding the cementing step by which the actual union of the celluloid film-base of the two sections is caused. In ordinary practice the emulsion is removed from a narrow path at one extreme end of the underlying section of film, so to expose the celluloid film-base to the action of a cementing or dissolving medium and the extreme end of the celluloid film-base of the other section applied thereto; such emulsion-removing step is ordinarily performed by a wet or emulsion-dissolving or softening and cleaning process or by a scraping process in which a razor-edged and consequently flexible tool is drawn across the face of the film with a view to the removal of the emulsion without injury to the film-base, which will readily be understood to be a very delicate task and which in practice on a large scale I have found to be unsatisfactory due to the frequent scraping, scratching, tearing and parting by cutting, of the film-base.

So great is the risk, that in attempting to splice a motion picture film at or near a vital scene or picture thereon, to insure non-destruction of such vital picture in the splicing process, three or more frequently undesirable pictures are usually allowed to remain at the end of the section carrying the vital picture and between the same and the splice, when the usual splicing methods are employed.

In accordance with the invention, and in the prepared practice of my novel method, I suitably position the film and remove the photographic emulsion therefrom by the rotatory movement of a suitable tool, which preferably may be adjusted by means of precision means whereby the depth of cut is controlled or regulated, the tool being rapidly rotated as relative movement thereof transversely of the film is caused, after which a cementing or joining substance is applied to the end of one of the sections of motion picture film to be joined and directly to the film-base portion thereof, after which the end of the other section is momentarily pressed into close contact with such cement-receiving end and the splice so completed. By the employment of the above method, which will be well understood in all of its details, by persons skilled in the art, from the description hereinafter of apparatus susceptible of carrying out the method and the further detailed explanation herein of the steps of the method, motion picture film may be satisfactorily spliced between any two pictures desired, the splice necessary for proper joining of the two picture-bearing sections occupying only a very slight portion of the film length lying between the joining pictures.

A further object of the invention is to provide a novel apparatus, susceptible of carrying out the steps of the method, which will be relatively simple and inexpensive in construction and organization when its advantages such as positiveness in action, freedom from liability to mutilate the film-base or other film portions, high efficiency, reduction of time consumed in film splicing, and general superiority in service are considered.

With the above and other objects in view, the invention consists in the novel useful series of steps, and in the provision, formation, combination, association, relative arrangement, and mode of operation of parts, members and features, all as hereinafter described, shown in the drawing, and finally pointed out in claims.

In the drawing:

Figure 1 is a fragmentary perspective view of film splicing apparatus constructed and organized to embody the invention;

Figure 2 is a fragmentary enlarged front elevation showing the novel emulsion-removing feature shown in Figure 1 in position for action in the emulsion removing step;

Figure 3 is a fragmentary elevation taken at right angles to the showing in Figure 2, and looking in the direction of the large arrow near Figure 2;

Figure 4 is a detailed view showing the circuit closing arrangement for the electrically operated emulsion-removing tool;

Figure 5 is a fragmentary partly sectional vertical detail view of adjustment features;

Figure 6 is a transverse sectional detail view of the guide member, the view being taken on the line $x^6$—$x^6$, Figure 3;

Figure 7, is a fragmentary enlarged perspective view illustrating the preferred form of emulsion-removing tool;

Figure 8 is an enlarged fragmentary front elevation of support and clamping members, the end of a section of film being shown as positioned for the emulsion-removing step; and Figure 9 is an enlarged fragmentary edge view of two film sections positioned as they are just prior to the joining step.

Corresponding parts in all the figures are designated by the same reference characters.

Referring with particularity to the drawing, in the embodiment of the invention therein shown, A designates one section of a motion picture film to be spliced, B designates another section thereof, C designates generally the head of film splicing apparatus constructed and organized to embody the invention, D designates film supporting or clamping means for the section A, E designates film supporting or clamping means for the section B, and F designates emulsion or photographic-film-removing means.

The general organization of the head C may follow ordinary practice or may be of any preferred construction and may comprise the usual features of such devices, such as a main frame 10, means for heating certain parts to cause the proper union of the film sections A and B, cutting devices, lighting features, support, actuating means for the various features and such like parts and devices, well understood in the art.

The means D is shown as comprising a pedestal 11 upon which a lower clamp plate cutter 12 is mounted and upon which the film section is received, an upper clamp plate cutter 13 mounted upon an arm 13$^a$ pivotally mounted upon the frame 10, and the usual means, not shown, for operating the arm 13$^a$ to retract the upper clamp plate 13 or press the same into film clamping action.

The means E may comprise the usual lower clamp plate cutter 14 rotatably mounted in the framework 10 by an arm 14$^a$, an upper clamp plate cutter and its arm 15 rotatably mounted in the framework 10 and the usual operating devices therefor, not shown.

The clamp plate cutters and pedestal features may be employed in the usual manner, the group D having the film section A applied thereto preparatory to the emulsion-removing step with the desired end picture thereof clamped between the lower and upper cutters of the group. The film section B may be clamped between the lower and upper members of the group E in the usual manner and raised to the position shown in Figure 1. It will be understood that the arrangement of these cutter members is such that upon the group E being actuated to bring the same to their lowermost position, after the emulsion-removing step and the cement applying step have been performed, both sections A and B will be trimmed at the required point for splicing and the section ends pressed together at the area where the emulsion has been removed, so to form a perfect splice. The heating of the clamping members may be accomplished in the usual manner, as for instance by means of electrical resistance units, not shown. The application of pressure by heated clamping members at the joint facilities the setting of the cement and greatly expedites the making of a splice.

The emulsion-removing means F is shown as comprising a supporting member 16 secured to the framework 10 as by screws 17, or the same may be made integrally with the framework 10, an arbor or guide member 18 rotatably mounted in the member 16 as at 16$^a$, an oscillatory and reciprocatory framework 19 mounted for longitudinal reciprocation on the guide member 18 to which it is keyed or spliced as at 18$^a$, and an adjustable emulsion removing device carried by the framework or member 19. The guide member 18 is fitted in a suitable bore in the member 16 and the portion thereof projecting into such bore is circular and has a circumferential notch 18$^a$, into which a set screw 18$^b$ threaded into a suitable aperture in the member 16 projects; this set screw 18$^b$ limits the oscillatory movement of the member or framework 19, to the end that the means F may be swung upwardly and out of the film zone when steps of the method other than the emulsion-removing process are being carried out. A convenient arrangement is to have the axis of oscillation of the means F at right angles to the axis of oscillation of the clamp members. The guide member 18 may have a head 20 to limit the outward travel of the member or framework 19 which is bored to fit the guide member 18.

The supporting member 16 is shown as comprising a base member 16$^a$ and an upper member 16$^b$ secured thereto by a pivot stud 16$^c$ having a nut 16$^d$, the members 16$^a$ and 16$^b$ being suitably apertured to receive such pivot stud 16$^c$. Channels are provided in each of the members 16$^a$ and 16$^b$ in the matched faces thereof, to receive an alignment pin 21 which may be secured to the framework by a chain 21$^a$; upon removal of such alignment pin, after the pressure of the nut 16ª has been relieved, the upper or guide carrying member 16ᵇ may be oscillated or rotated about the pivot stud 16ᶜ, so that the emulsion removing tool may be passed over a considerable area in emulsion-removing action in the plane of the film support, due to the universal mounting provided by this feature together with the other provision made in the mounting of the framework 19.

The emulsion-removing device $f$ is shown as comprising a rotatable tool having a shank 22 and a blade 23, mounting means $f$ for the tool wherein the same is mounted for rotation, means $f''$ for rotating the tool, precision means $g$ for adjusting the tool vertically, guide means $g'$ for guiding the tool, precision means $g''$ for adjusting the tool horizontally with respect to its guide means $g'$, and precision means $g'''$ for adjusting the mounting means $f'$ horizontally.

The rotatable tool preferably has its blade 23 formed of a strip of sheet metal in order to provide for a flat lower or under edge 23ª which is preferably in right angular relation to the vertical edges of the blade. This blade 23 is preferably set into a vertical recess at 23ᵇ in the lower end of the shank 22. While I have shown a tool in the drawings having its shank directly connected with the means $f''$ for rotating the tool, it will of course be understood that I may depart from the specific form shown and interrupt the long shank or spindle as shown, by a chucking device adapted to receive removable blades of the general character having short shanks.

The mounting means $f'$ is shown as a member having a vertical tubular body 24 provided with horizontal bored guide bosses 25 through the bore of each of which extends a shaft or guide 26 projecting from the framework or member 19. A fine thread screw 27 has its head socketed at 27ª in the tubular body 24 and is threaded through a suitable aperture in the member or framework 19 to the end that accurate and minute horizontal adjustment of the tool mounting with respect to the member 19 may be made. At its outer end the screw 27 may be formed to receive a suitable adjusting tool. Set screws 27ª are provided to maintain the parts in any position of adjustment. The screw 27 and associated parts constitute the means of adjustment $g'''$. A bushing 28 having a fine external thread 28ª is threaded into the bore of tubular body 24 which has internal threads to match the threads at 28ª on the bushing. Such bushing is shown as extending through the tubular body 24 from end to end thereof, and a lock nut 28ᵇ is applied to the thread 28ª in position to be tightened against the tubular body and preserve the adjustment made by rotation of the bushing 28 by means of its head or thumb piece 28ᶜ. This bushing and lock nut device constitutes the precision means $g$ comprised within the mounting means. The tool shank or spindle is rotatably mounted in the bore of the tubular bushing 28 and held thereto by an upper thrust collar 29 and a lower thrust collar 30.

The guide means $g'$ is shown as a foot 31 extending downwardly from the tubular body 24. This foot 31 has a flat under surface and downwardly depending spaced lugs 32 formed integrally therewith; an angle bearing or guide plate 33 adapted to ride upon the upper surface and against the working edge surface of the upper clamp member 13 of the group D lies beneath the under surface of the foot 31 and may be secured in any position of adjustment thereto by a set screw device 34 extending through a vertical slot 34ª in the base of the foot 31. A fine thread screw 35 has its head socketed in the vertical wall of the angle plate 33 near each end thereof and is threaded through an aperture 35' in the corresponding depending lug 32 which is internally threaded to match the respective screw. Each screw 35 may have its outer end formed for the reception of an adjusting tool. The angle plate and fine screw adjustment therefor constitute the precision means of tool adjustment $g''$.

The means for rotating the tool in emulsion-removing action is shown as an electric motor 36 fixed to an upper arm of the framework 19 as by screws 37. The motor spindle 37ª or shaft is shown as directly connected to the upper end of the tool shank 22 as by a slightly flexible coupling 37ᵇ.

Means for automatically controlling the starting of the motor upon movement of the rotatable tool into the zone of its operation may be provided and such means may comprise a switch bar 38 pivotally mounted upon the member 16ª and comprising a cam surface 38ª and a switch point 38ᵇ, and a roller 39 mounted upon the framework or member 19 for controlling the bar 38 in switch closing action upon the movement of the framework 19 outwardly upon its arbor or guide member 18. Upon movement of the framework 19 inwardly to a point where the tool is no longer in the working zone the circuit is interrupted due to the changed relation of roller and cam surface. The action of these parts will be readily understood by reference to Figure 4 where an electric circuit is diagrammatically shown, 39 designating the switch point on the bar, 40 the fixed switch point, and 41 a spring for holding the lever or switch bar cam surface to the roller.

The operation of the apparatus, the method, and the advantages of the invention will be readily understood from the foregoing disclosure, taken in connection with the accompanying drawing and the following statement:

The film section A is placed in position between the clamp members 12 and 13 with the end picture thereof under the upper clamp member 13 and the surface from which the emulsion is to be removed projecting to the right from under such member 13 and lying upon the projecting ledge formed where the lower member 12 projects toward the right beyond the guiding and cutting edge 13' of the member 13, the section B having first been positioned between clamp members 14 and 15 and moved to the position shown in Figure 1. The rotatory emulsion-removing tool is now brought to the working zone by swinging the framework 19 and parts carried thereby from the position shown in Figure 1 to the position best shown in Figures 2 and 3, so resting the angle bearing or guide plate 33 upon the upper surface and against the right side edge of the upper clamp member 13. The operator next draws the framework 19 and associated parts forwardly and causes the rotating tool to move transversely of the film so removing the emulsion from the strip or area of film lying on the aforementioned ledge, the corresponding extreme end of the film section A being bent downwardly as shown in Figure 8. The parts having been priorly adjusted as to depth of cut so that the emulsion only is removed, and with the flat bottom of the rotating tool resting upon, but not mutilating or scratching, the celluloid film base, and as to adjustment horizontally of the tool blade so that the same cuts close to the edge of the clamp member 13 but does not touch the same, the tool blade operating in the space between the lugs 32, a perfectly clean area of film base on section A results from the passing of the rapidly rotating tool blade thereover. As the automatic switch device closes the motor circuit as the framework 19 is drawn toward the film, and the circuit is opened upon the return to its inner position of the framework 19, the operator need not make a special effort to start and stop the rotation of the tool.

After the area has been so cleaned, a cement consisting, for instance, of amyl acetate and acetone, or any other suitable substance, may be applied to the exposed film base area, and the right hand clamping and cutting members quickly brought down, to trim both film sections A and B and then press the underside of the section B at the trimmed end into contact with the cleaned cement-bearing area of the section A, so completing the splice.

I do not desire to limit myself to the specific disclosure herein, but reserve the right to vary the form of apparatus, and the sequence of steps of the method in carrying out the same, and all without departing from the spirit of the invention and the terms of the following claims.

Having thus disclosed my invention, I claim and desire to secure by Letters Patent:

1. Film splicing apparatus comprising means for supporting a film comprising a photographic film per se and its base, rotatable means for removing the photographic film from its base, and means for operating said rotatable means; said rotatable means comprising a tool having an edge adapted for superficial contact with the film base and being mounted for rotation about an axis perpendicular to the plane in which the film is supported and movable in a plane parallel to said plane of film support.

2. Film splicing apparatus comprising means for supporting a film comprising a photographic film per se and its base, rotatable means for removing the photographic film from its base, means for operating said rotatable means; said rotatable means comprising a tool having an edge adapted for superficial contact with the film base and being mounted for rotation about an axis perpendicular to the plane in which the film is supported and movable in a plane parallel to said plane of film support; and means for guiding the rotatable tool in its travel transversely of the film.

3. In apparatus of the character disclosed, a pedestal, a lower film-supporting clamp member thereon, an upper clamp member coacting with said lower clamp member in film clamping action, a rotatable tool adapted to be passed over film surfaces in emulsion-removing action and in superficial non-mutilating contact with the film base, means for rotating said tool, means for adjustably mounting said tool for swinging movement into and out of operative position, precision means for adjusting said tool with respect to depth of cut, guide means carried by said mounting means and coacting with said upper clamp member in tool-guiding action, and precision means for adjusting said tool with respect to said upper clamp member.

4. In a film splicing apparatus, an electrically operated film-scraping tool adjustably mounted for movement into and out of film-scraping position, and means for automatically starting the said tool, said means including a normally open circuit and a tool-operated circuit closer operating to close the circuit automatically upon movement of the tool into operative position.

In testimony whereof, I have signed my name to this specification.

ROY HENRY KLAFFKI.